US012008928B2

(12) United States Patent
Klages et al.

(10) Patent No.: US 12,008,928 B2
(45) Date of Patent: Jun. 11, 2024

(54) LABELLING MATERIAL FOR MARKING ELECTRICAL INSTALLATIONS AND METHOD FOR PRODUCING A LABELLING STRIP

(71) Applicant: PHOENIX CONTACT GmbH & Co. KG, Blomberg (DE)

(72) Inventors: Kilian Klages, Detmold (DE); Alexander Hofmann, Hameln (DE)

(73) Assignee: PHOENIX CONTACT GmbH & Co. KG, Blomberg (DE)

( * ) Notice: Subject to any disclaimer, the term of this patent is extended or adjusted under 35 U.S.C. 154(b) by 305 days.

(21) Appl. No.: 17/431,959

(22) PCT Filed: Feb. 19, 2020

(86) PCT No.: PCT/EP2020/054334
§ 371 (c)(1),
(2) Date: Aug. 18, 2021

(87) PCT Pub. No.: WO2020/178025
PCT Pub. Date: Sep. 10, 2020

(65) Prior Publication Data
US 2022/0157203 A1 May 19, 2022

(30) Foreign Application Priority Data
Mar. 5, 2019 (DE) ..................... 10 2019 105 526.1

(51) Int. Cl.
*H01R 13/46* (2006.01)
*G09F 3/06* (2006.01)
(Continued)

(52) U.S. Cl.
CPC .................. *G09F 3/06* (2013.01); *G09F 3/16* (2013.01); *G09F 3/20* (2013.01); *H01R 9/2475* (2013.01); *H01R 9/2683* (2013.01); *H01R 13/465* (2013.01)

(58) Field of Classification Search
CPC ..... G09F 3/06; G09F 3/16; G09F 3/20; H01R 13/46; H01R 9/24; H01R 9/26; H01R 13/465; H01R 9/2475; H01R 9/2683
See application file for complete search history.

(56) References Cited

U.S. PATENT DOCUMENTS 4,884,353 A 12/1989 Taylor
8,479,914 B2 7/2013 Jones
(Continued)

FOREIGN PATENT DOCUMENTS

CN 101295365 A 10/2008
CN 101322167 A 12/2008
(Continued)

OTHER PUBLICATIONS

3 M Deutschland GmbH Die neuen 3M PE-Klebebänder, Neuss, 2016. 5 Seiten—Firmenschrift.
(Continued)

*Primary Examiner* — Cassandra Davis
(74) *Attorney, Agent, or Firm* — Occhiuti & Rohlicek LLP

(57) ABSTRACT

Labeling material for marking electrical installations, comprising a top layer, the top layer having a top surface which is designed for printing and a joining surface facing away from the top surface, comprising a foam layer, comprising at least one shaped element for form-fitting attachment to a receptacle, the foam layer comprising a foamed material, the foam layer being integrally bonded to the top layer in the
(Continued)

region of the joining surface, and the shaped element being arranged at a spacing from the top layer.

11 Claims, 4 Drawing Sheets

(51) Int. Cl.

| | |
|---|---|
| ***G09F 3/16*** | (2006.01) |
| ***G09F 3/20*** | (2006.01) |
| *H01R 9/24* | (2006.01) |
| *H01R 9/26* | (2006.01) |

(56) References Cited

U.S. PATENT DOCUMENTS

| | | | | |
|---|---|---|---|---|
| 8,905,858 | B2 * | 12/2014 | Nivanh | A63B 53/04 473/324 |
| 9,058,752 | B2 * | 6/2015 | Ganster | G09F 7/06 |
| 9,145,023 | B2 | 9/2015 | Steyaert | |
| 10,062,979 | B2 * | 8/2018 | Adams | G09F 3/06 |
| 10,369,735 | B2 * | 8/2019 | Speith | B29C 48/12 |
| 11,427,015 | B2 * | 8/2022 | Speith | B41J 11/057 |
| 11,545,053 | B2 * | 1/2023 | Wieneke | B41F 17/00 |
| 2011/0279841 | A1 * | 11/2011 | Reibke | G09F 3/205 225/96 |
| 2014/0068983 | A1 | 3/2014 | Adams et al. | |
| 2018/0149081 | A1 * | 5/2018 | Newman | F02B 77/005 |
| 2019/0184913 | A1 * | 6/2019 | Fallon | C08J 9/00 |
| 2022/0118668 | A1 * | 4/2022 | Dellock | B29C 48/911 |

FOREIGN PATENT DOCUMENTS

| | | | |
|---|---|---|---|
| CN | 102301406 | A | 12/2011 |
| CN | 107073784 | A | 8/2017 |
| DE | 1889286 | U | 3/1964 |
| DE | 202004010070 | U1 | 11/2005 |
| DE | 202009011177 | U1 | 10/2010 |
| DE | 102010013758 | A1 | 10/2011 |
| DE | 102015109020 | A1 | 3/2016 |
| DE | 202017102224 | U1 | 7/2018 |
| EP | 0667234 | B1 | 5/1998 |
| GB | 898255 | A | 6/1962 |
| JP | H10119445 | A | 5/1998 |
| JP | 2003081232 | A | 3/2003 |
| KR | 100838111 | B1 | 6/2008 |
| RU | 2088990 | C1 | 8/1997 |
| WO | 9324941 | A1 | 12/1993 |
| WO | 2018139520 | A1 | 8/2018 |

OTHER PUBLICATIONS 15 zum Produkt Switchmark als ein Label-Halter.

Product data sheet for double-sided PU adhesive tapes “Scotch-Mount”.

Wikipedia article on “foam” from Jan. 21, 2019.

International Report on Patentability issued on Sep. 16, 2021 in PCT Application No. PCT/EP2020/054334.

* cited by examiner

LABELLING MATERIAL FOR MARKING ELECTRICAL INSTALLATIONS AND METHOD FOR PRODUCING A LABELLING STRIP

CROSS-REFERENCE TO RELATED APPLICATIONS

This application is a national phase under 35 U.S.C. 371 of International Application No. PCT/EP2020/054334 filed on Feb. 19, 2020, which claims priority to German Application No. 10 2019 105 526.1 filed on Mar. 5, 2019, the contents of all of which are hereby incorporated by reference in their entireties.

BACKGROUND OF THE INVENTION

The present invention relates to a labeling material for marking electrical installations and to a method for producing a labeling strip for an electrical installation with such a labeling material.

When producing labels for electrical installations, e.g. for labeling terminal blocks in a control cabinet, the challenge is to produce and apply the labels as efficiently as possible.

When printing on labeling material provided as continuous material, it should be ensured, for example, that the slippage when the labeling material is fed in and passed through within the printer can be corrected so that high printing accuracy can also be achieved over longer printing lengths.

The labeling material itself, which is the printing medium, should be usable for as many applications as possible. With pre-trimmed labeling material, for example, there therefore is the disadvantage that it is intended only for the production of labeling strips for a specific terminal block length, and consequently a separate print medium must be kept available for different terminal block lengths.

Furthermore, the labeling surface of the labeling material should be as large as possible in order to be able to display the required information in a legible manner.

The application and removal of a labeling strip, for example on a terminal block or another bearing rail component, should also be possible in a simple manner without residue and without additional fastening means.

SUMMARY OF THE INVENTION

Against this background, the present invention is based on the technical problem of specifying a labeling material and a method for producing a labeling strip which at least partially or completely solve the above challenges. The problem is solved by a labeling material according to claim 1 and a method according to claim 10. Further embodiments of the invention can be found in the dependent claims and the following description.

According to a first aspect, the invention relates to a labeling material for marking electrical installations, comprising a top layer, the top layer having a top surface which is designed for printing and a joining surface facing away from the top surface, comprising a foam layer, comprising at least one shaped element for form-fitting attachment to a receptacle, the foam layer comprising a foamed material, the foam layer being integrally bonded to the top layer in the region of the joining surface, and the shaped element being arranged at a spacing from the top layer.

The foam layer can have an open- or closed-pore soft foam or consist of an open- or closed-pore soft foam. The soft foam can have a Shore hardness selected from a range of from Shore A20 up to and including Shore A40.

The foam layer can be compressed during the labeling or printing of the top layer, for example by means of a thermal transfer printer, in order to achieve sufficient stability during the printing process. In the relaxed, non-compressed state of the foam layer, a spacing is formed between the molded element and the top layer, so that the molded element can be inserted into an undercut or groove, for example, and attached in a form-fitting manner.

The labeling material can be a printing medium for a label printer which is kept available as continuous material and/or on a roll.

The top layer can comprise a PET (polyethylene terephthalate) or consist of a PET. In particular, the top layer can comprise a multilayer PET-GAG or consist of a multilayer PET-GAG, which is a multilayer film composite consisting of a top layer PET-G (PET coextruded with glycol), an intermediate layer PET-A (amorphous PET) and a bottom layer PETG, the intermediate layer being enclosed on two sides by the top layer and the bottom layer.

According to a further embodiment of the invention, the top layer, viewed in a cross section, has a greater width than the foam layer. In this way, a large top surface can be provided for labeling.

The width of the top layer can be 8 mm or more. The width of the top layer can be, for example, 10 mm+/−0.3 mm. The width of the top layer can be less than 30 mm.

The width of the foam layer can be 3 mm or more. The width of the foam layer can be 5 mm. The width of the foam layer can be less than 20 mm.

Alternatively or additionally, the top layer, viewed in a cross section, can have a smaller thickness than the foam layer. In this way, a compact, inexpensive labeling material can be specified.

The thickness of the top layer, measured in the cross section perpendicularly to the width, can be 0.3 mm or more. The thickness of the top layer can be 0.3 mm. The thickness of the top layer can be 0.5 mm. The thickness of the top layer can be 0.5 mm or more.

The thickness of the foam layer, measured in the cross section perpendicularly to the width, can be 2 mm or more. The thickness of the foam layer can be 2.2 mm. The thickness of the foam layer, measured in the cross section perpendicularly to the width, can be 3 mm or more. The thickness of the foam layer can be 3.3 mm.

Another embodiment of the labeling material is characterized in that the shaped element is a ridge. The ridge, viewed in a cross section, can be shaped so as to protrude in a width direction.

The shaped element, viewed in a cross section, can have a thickness of 0.3 mm or more. The shaped element can have a thickness of 0.5 mm. The shaped element can have a thickness of 1 mm or more in one. The shaped element can have a thickness of 1.05 mm.

Two or more shaped elements can be provided.

Two shaped elements can be formed so as to face away from one another and protrude in opposite directions. Two ridges can thus be provided which are formed so as to face away from one another and protrude in opposite directions.

The shaped element or the shaped elements can be designed to be locked in a locking groove. For example, shaped elements designed as ridges can be pressed with at least partial elastic deformation into a locking groove which has an undercut, the ridges being locked within the locking groove.

The shaped element can be part of the foam layer. It goes without saying that the foam layer can have two or more shaped elements in the manner described above.

The foam layer comprising shaped elements can have one or more, in particular two, molded-in guide channels on the side facing away from the top layer, which guide channels serve to guide the labeling material along a profiled printer roller.

According to a further embodiment, the labeling material has a support layer, the support layer being integrally bonded to the foam layer on a side of the foam layer facing away from the top layer.

The support layer can comprise a PET or consist of a PET.

The shaped element can be part of the support layer. The support layer can have two or more shaped elements.

The shaped elements of the support layer can be two ridges facing away from one another, which are formed by the support layer, viewed in a cross section, extending so as to protrude over the width of the foam layer on two sides in the width direction.

Accordingly, the support layer, viewed in a cross section, can have a greater width than the foam layer.

Alternatively or additionally, the support layer, viewed in a cross section, can have a smaller width than the top layer. In this way, the largest possible top surface can be provided for labeling.

The width of the support layer can be 5 mm or more. The width of the support layer can be 6.2 mm or 6.24 mm. The width of the support layer can be 25 mm or less.

The labeling material can also be referred to as a labeling profile.

The labeling profile can have optically detectable position marks spaced apart from one another on at least one surface facing away from the top surface, intermediate regions being formed between the position marks and the position marks in particular having reflective properties that differ from the intermediate regions.

The position marks are used to determine the relative position of the labeling profile to a printer, such as a label printer or the like. In this way, the position of the labeling profile, which can be provided as continuous material, for example, relative to a print head can be detected in order to achieve high printing accuracy even over longer printing lengths.

In the present case, “optically detectable position mark” means that the position mark can be detected by an optical detector, such as a light sensor, a light barrier or the like.

Another embodiment of the labeling profile is characterized in that the position marks are formed by a plurality of regions that are spaced apart in the longitudinal extension and have limited reflectivity and/or limited translucency, the regions having limited reflectivity and/or limited translucency being formed in particular by black or dark coloring. The position marks can be so-called black marks.

For example, local coloring and/or gluing and/or coating can be used to create a position mark in each case that can be detected with an optical sensor.

Alternatively or additionally, a position mark that can be detected with an optical sensor can be created by providing an at least partially translucent region which is surrounded by intermediate regions that are less translucent than the position mark.

In order to be compact and yet reliably detectable, a position mark can have a length of 4 mm or more, measured in the longitudinal extension. Alternatively or additionally, a position mark can have a height, measured transversely to the longitudinal extension, of 3 mm or more.

Each position mark can be provided flat on the top surface itself or on a surface facing away from the top surface.

In order to achieve high printing accuracy, the position marks, viewed in the longitudinal extension, can have a spacing of 20 mm or more, in particular have a spacing of 30 mm or more, in particular have a spacing of 30 mm.

If the labeling material does not have a support layer, one or more position marks, such as black marks or the like, can be formed on the foam layer.

If the labeling material has a support layer, one or more position marks, such as black marks or the like, can be formed on the support layer.

The layers of the labeling material can be connected to one another by means of gluing and/or heat sealing. The layers of the labeling strip are the top layer and the foam layer, or the top layer, the foam layer and the support layer.

According to a second aspect, the invention relates to a method for producing a labeling strip for an electrical installation, comprising the method steps of:

- providing a labeling material, the labeling material being designed in a manner according to the invention;
- feeding the labeling material to a label printer;
- compressing the foam layer between a print head and a print roller of the label printer while the top layer is being labeled, wherein the print roller is in particular profiled;
- trimming and/or perforating the labeling material to form at least one labeling strip at a predefined length.

In the present case, the foam layer is compressed during the labeling or printing of the top layer, for example by means of a thermal transfer printer, in order to achieve sufficient stability during the printing process. In the relaxed, non-compressed state of the foam layer, a spacing is formed between the molded element and the top layer, so that the molded element can be inserted into a locking groove, for example, and attached in a form-fitting manner.

In this way, a labeling strip that has been labeled and cut to length can be clicked or locked into a locking groove of a terminal block or another bearing rail component.

In the present case, trimming means dividing the labeling material in order to cut a labeling strip to length.

In the present case, perforating means providing a predetermined breaking point on the labeling material in order to facilitate subsequent cutting to length and separation of a labeling strip from the labeling material.

It can be provided that when the foam layer is compressed between a print head and a print roller of the label printer while the top layer is being labeled, the thickness of the foam layer, viewed in a cross section, is reduced in particular by at least 30%, more particularly reduced by at least 50%.

According to further embodiments, as an alternative or in addition to form-fitting and/or force-fitting attachment, the labeling strip can be bonded to a terminal block or a bearing rail module.

The labeling material can have one or more adhesive layers. The one or more adhesive layers can each be covered by a protective layer which can be peeled off prior to application in order to expose the adhesive layer.

The invention is described in greater detail in the following with reference to drawings showing embodiments, in which, schematically:

DETAILED DESCRIPTION

Figure 1:
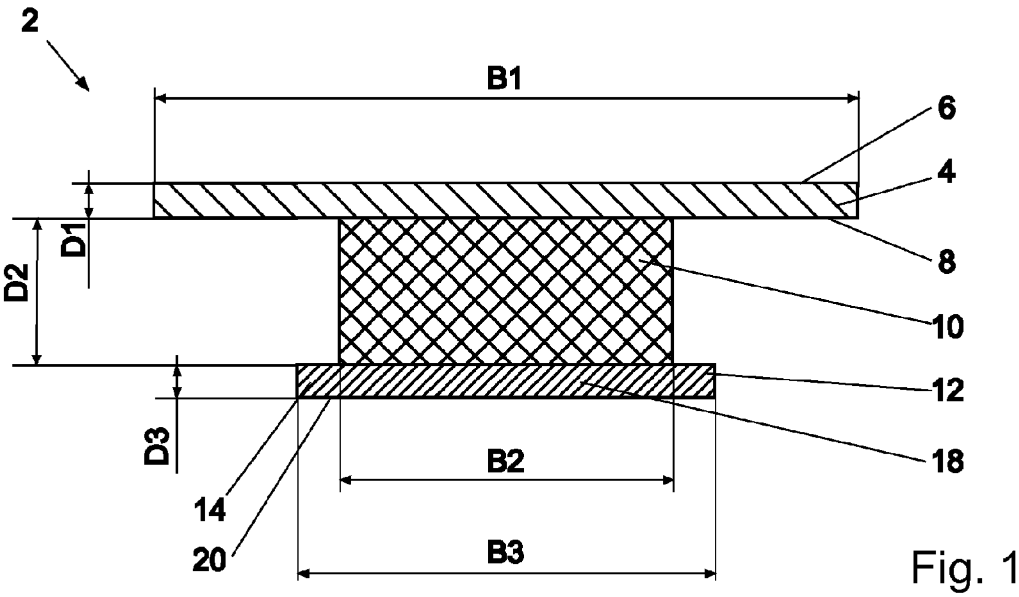
FIG. 1 shows a labeling material according to the invention in a cross section.

FIG. 1 shows a labeling material 2 for marking electrical installations in a cross section. The labeling material 2 can be provided as continuous material and/or on a roll and supplied to a label printer, such as a thermal transfer printer or the like.

The labeling material 2 has a top layer 4, the top layer 4 having a top surface 6 designed for printing or labeling and a joining surface 8 facing away from the top surface 6.

The labeling material 2 also has a foam layer 10. The labeling material 2 has two shaped elements 12, 14 for the form-fitting attachment of a labeling strip produced from the labeling material 2 to a receptacle 16.

In the present case, the foam layer 10 consists of a foamed material. The foam layer 10 is integrally bonded to the top layer 4 in the region of the joining surface 8. The shaped elements 12, 14 are arranged at a spacing from the top layer 4. In the present case, the top layer 4 consists of a three-layer PET-GAG.

In the cross section shown in FIG. 1, the top layer 4 has a greater width B1 than the width B2 of the foam layer 10. The top layer 4, viewed in cross section, also has a smaller thickness D1 than the thickness D2 of the foam layer 2.

In the present case, the width B1 of the top layer is approximately 10 mm. The width B2 of the foam layer is approximately 5 mm in the present case. The shaped elements 12, 14 are formed as ridges 12, 14 protruding laterally over the width B2 of the foam layer 10.

The ridges 12, 14 are part of a support layer 18, the support layer 18 being integrally bonded to the foam layer 10 on a side of the foam layer 10 facing away from the top layer 4. The support layer 18 is made of PET in the present case.

In order to form the laterally protruding ridges 12, 14, the support layer 18, viewed in cross section, has a greater width B3 than the width B2 of the foam layer 10. The support layer 18 has a width B3 of approximately 6 mm. The thickness D3 of the support layer 18 corresponds approximately to the thickness D1 of the top layer 4, namely approximately 0.5 mm. The thickness D2 of the foam layer 10 is approximately 2.2 mm.

The labeling material 2 is provided, on a side 20 facing away from the top surface 6, with a plurality of position marks 22 which extend over the width B3 of the support layer 18. In the present case, the position marks 22 are black marks.

The layers 4, 10, 18 of the labeling material 2 are bonded to one another in the present case.

Figure 2:
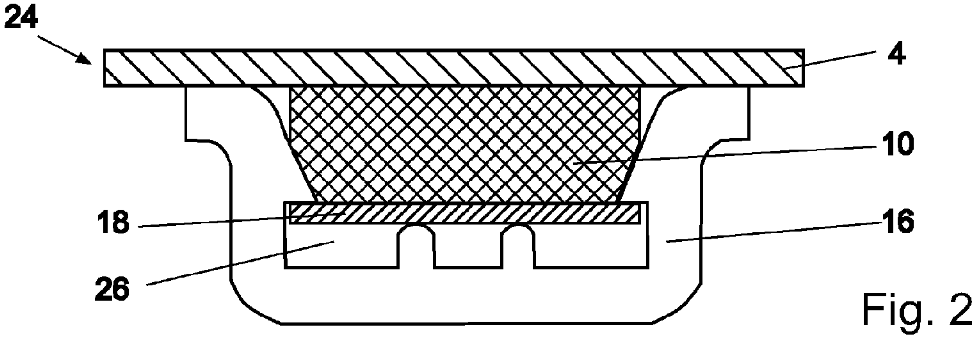
FIG. 2 shows a labeling strip produced from the labeling material according to FIG. 1 in a cross section in the applied state.
Figure 3:
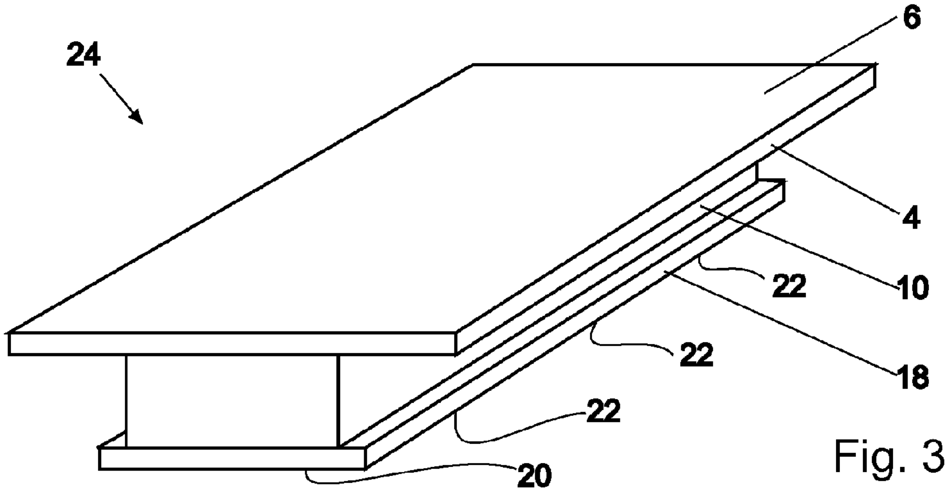
FIG. 3 is a perspective view of the labeling strip from FIG. 2.

As can be seen from FIG. 2, a labeling strip 24 cut to length from the labeling material 2 can be clicked or locked into a receptacle 16 formed as a locking profile 16 with a receiving groove 26. Such a receptacle 16 can be provided, for example, on a terminal block or another bearing rail module in order to attach labeling strips thereto. The foam layer 10 is partially compressed and, in portions, lies flush against the flanks of the locking profile 16 facing the foam layer 10. According to further embodiments, the labeling strip can be bonded to a terminal block or a bearing rail module. For this purpose, the labeling material can have one or more adhesive layers. The one or more adhesive layers can be covered by a protective layer which can be peeled off prior to application in order to expose the adhesive layer.

In order to produce the labeling strip 24 from the labeling material 2, the labeling material 2 is provided and fed to a label printer (not shown). During the printing process, the foam layer 10 is compressed between a print head and a print roller of the label printer in order to allow a stable printing process.

The labeling material 2 is then trimmed and/or perforated in order to cut a labeling strip, such as the labeling strip 24, of the labeling material 2 to size and/or to mark a predefined length by means of a predetermined breaking point. During the printing, the foam layer can be reduced in its thickness D2 by at least 50%.

Figure 4:
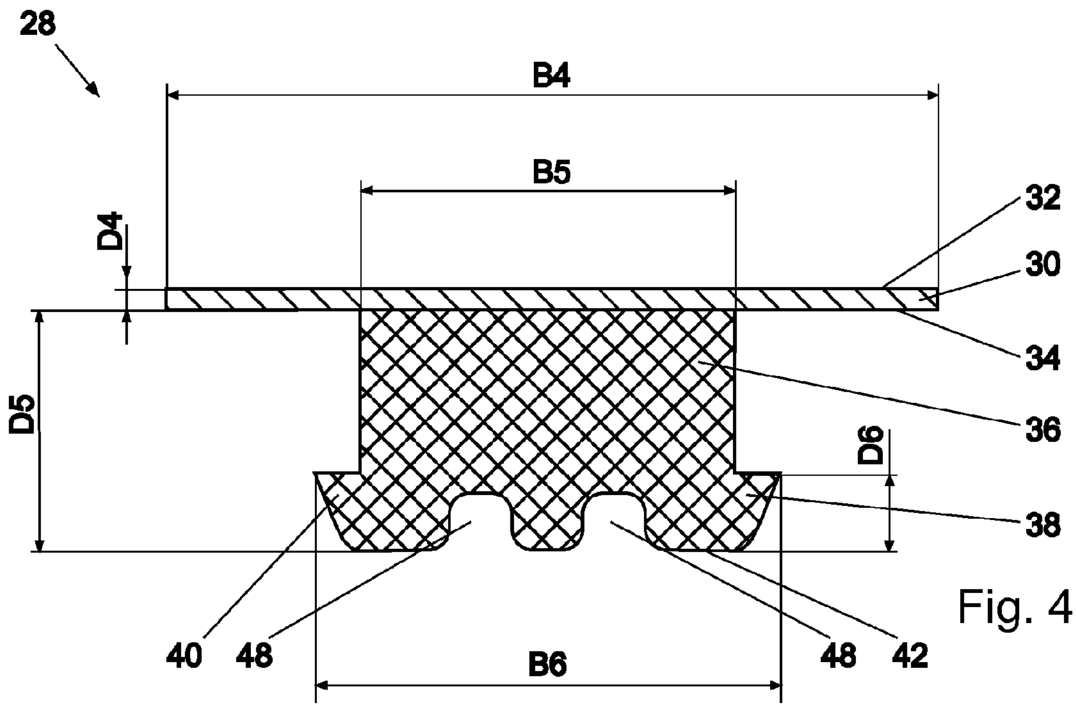
FIG. 4 shows a further labeling material according to the invention in a cross section.

FIG. 4 shows a further embodiment of a labeling material 28 according to the invention for identifying electrical installations in a cross section. The labeling material 28 can be supplied to a label printer, such as a thermal transfer printer or the like, as continuous material and/or on a roll.

The labeling material 28 has a top layer 30, the top layer 30 having a top surface 32 designed for printing or labeling and a joining surface 34 facing away from the top surface 32. The labeling material 28 also has a foam layer 36. The labeling material 28 has two shaped elements 38, 40 for form-fitting attachment to a receptacle 16. In the present case, the shaped elements 38, 40 are part of the foam layer 36.

In the present case, the foam layer 36 consists of a foamed material. The foam layer 36 is integrally bonded to the top layer 30 in the region of the joining surface 34. The shaped elements 38, 40 are arranged at a spacing from the top layer 30. In the present case, the top layer 30 consists of a three-layer PET-GAG.

In the cross section shown in FIG. 4, the top layer 30 has a greater width B4 than the width B5 of the central portion of the foam layer 10. The top layer 4, viewed in cross section, also has a smaller thickness D4 than the thickness D5 of the foam layer 2. The thickness D4 of the top layer 30 is approximately 0.3 mm. The thickness D5 of the foam layer 36 is approximately 3.3 mm.

In the present case, the width B4 of the top layer is approximately 10.5 mm. The width B5 of the central portion of the foam layer is approximately 5 mm in the present case.

The shaped elements 38, 40 are formed as ridges 38, 40 protruding laterally over the width B5 of the central portion of the foam layer 36. The ridges 38, 40 are part of the foam layer 36. The thickness D6 of the ridges is approximately 1 mm.

The labeling material 28 is provided, on a side 42 facing away from the top surface 32, with a plurality of position marks 44 which extend over the width B6 of the foam layer 36. In the present case, the position marks 44 are black marks.

The layers 30, 36 of the labeling material 28 are bonded to one another in the present case.

Figure 5:
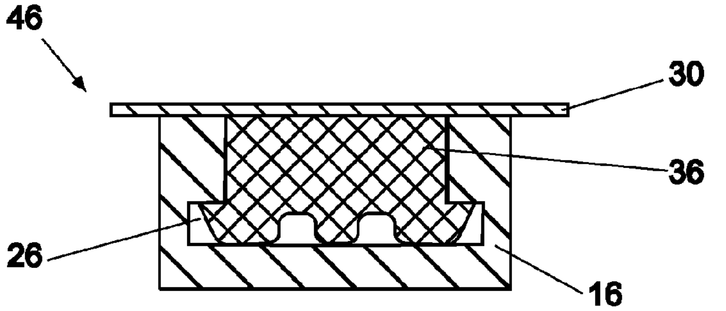
FIG. 5 shows a labeling strip produced from the labeling material according to FIG. 4 in a cross section in the applied state.
Figure 6:
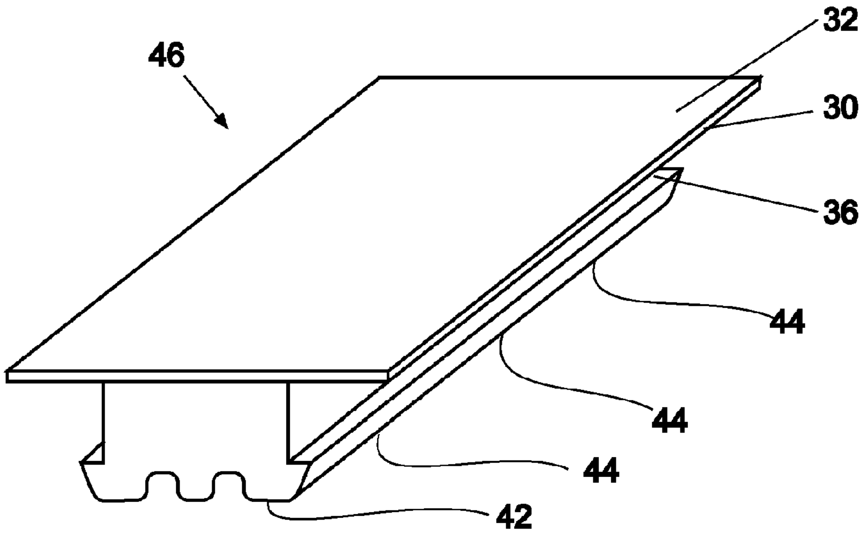
FIG. 6 is a perspective view from above of the labeling strip from FIG. 5.

As can be seen from FIG. 5, a labeling strip 46 cut to length from the labeling material 28 can be clicked or locked into a receptacle 16 formed as a locking profile 16 with a receiving groove 26. Such a receptacle can be provided, for example, on a terminal block or another bearing rail module in order to attach labeling strips thereto.

In order to produce the labeling strip 46 from the labeling material 28, the labeling material 46 is provided and fed to a label printer (not shown). During the printing process, the foam layer 36 is compressed between a print head and a print roller of the label printer in order to allow a stable printing process.

The labeling material 28 is then trimmed and/or perforated in order to cut a labeling strip, such as the labeling strip 46, of the labeling material 28 to size and/or to define a predetermined breaking point by perforation. During the printing, the thickness D5 of the foam layer can be reduced by at least 50%.

The foam layer 36 comprising shaped elements 38, 40 has two molded-in guide channels 48 on the side 42 facing away from the top layer 32, which guide channels serve to guide the labeling material 28 along a profiled printer roller. It goes without saying that the labeling material 2 shown in FIG. 1 can likewise have such rear guide channels which are molded into the support layer.

The labeling material and the labeling strips can also be referred to as labeling profiles. The labeling profiles 2, 24, 28, 46 can have position marks. This is described below by way of example for a labeling profile 102.

FIG. 5 shows a labeling profile 102 for marking electrical installations. The labeling profile 102 has a labeling region 104 which has a top surface 106 to be labeled.

Figure 7:
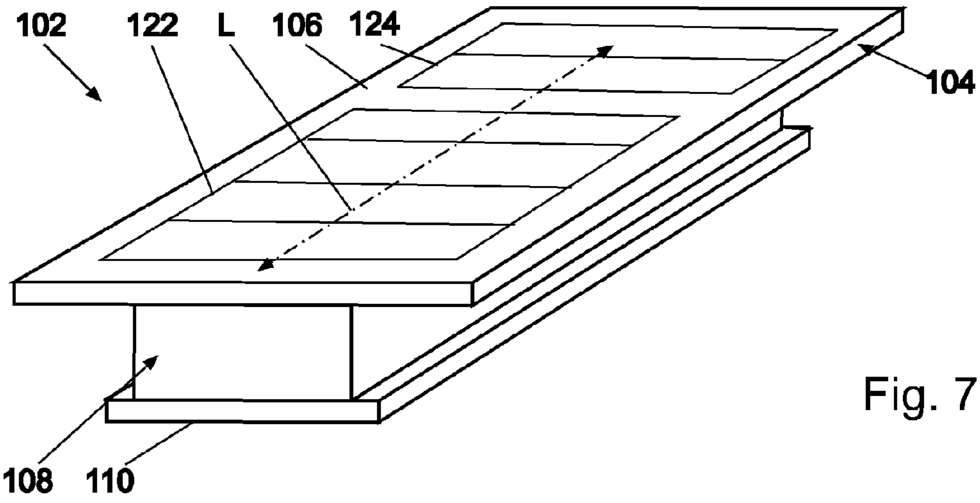
FIG. 7 is a perspective view of a labeling profile according to the invention.
Figure 8:
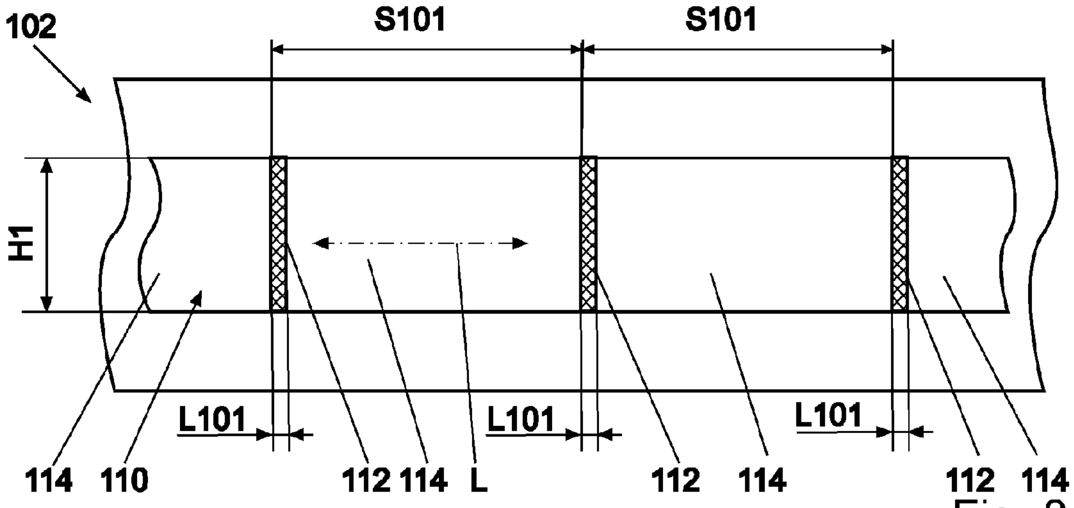
FIG. 8 is a view from below of the labeling profile from FIG. 1.
Figure 9:
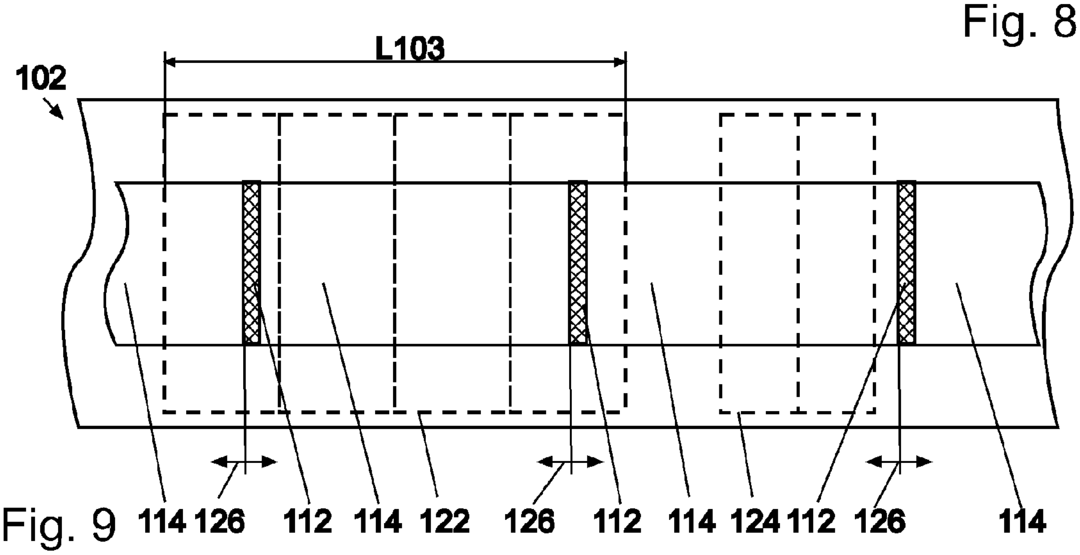
FIG. 9 is a further view from below of the labeling profile from FIG. 1.

The labeling profile 102 has a bearing region 108 which adjoins the labeling region 104 facing away from the top surface 106. As can be seen from FIG. 7, in a section transverse to the longitudinal extension direction L, the bearing region 108 has, at least in portions, a smaller width than the labeling region 104.

The labeling profile 102 is provided to a printer as continuous material.

The labeling profile 102, viewed along its longitudinal extension L, has a constant cross section. This means that the labeling profile 102 is not pre-trimmed with predetermined breaking points or the like and has no molded-in notches that would specify a longitudinal division.

The labeling profile 102 has, on a surface 110 facing away from the top surface 106, optically detectable position marks 112 which are spaced apart from one another. Intermediate regions 114 are formed between the position marks 112, the position marks 112 here having reflective properties that differ from those of the intermediate regions 114.

In the present case, the position marks 112 are formed by a plurality of regions 112 that are spaced apart from one another in the longitudinal extension L and have limited reflectivity. The position marks 112 are formed by local coloring of the labeling profile 102 made of plastics material.

In the present case, each position mark 112 has a length L101 of 4 mm, measured in the longitudinal extension direction L. Each position mark 112 has a height H101, measured transversely to the longitudinal extension L, of 20 mm. The position marks 112, viewed in the longitudinal extension L, are spaced 30 mm apart from one another. The spacing S101 is therefore 30 mm.

Figure 10:
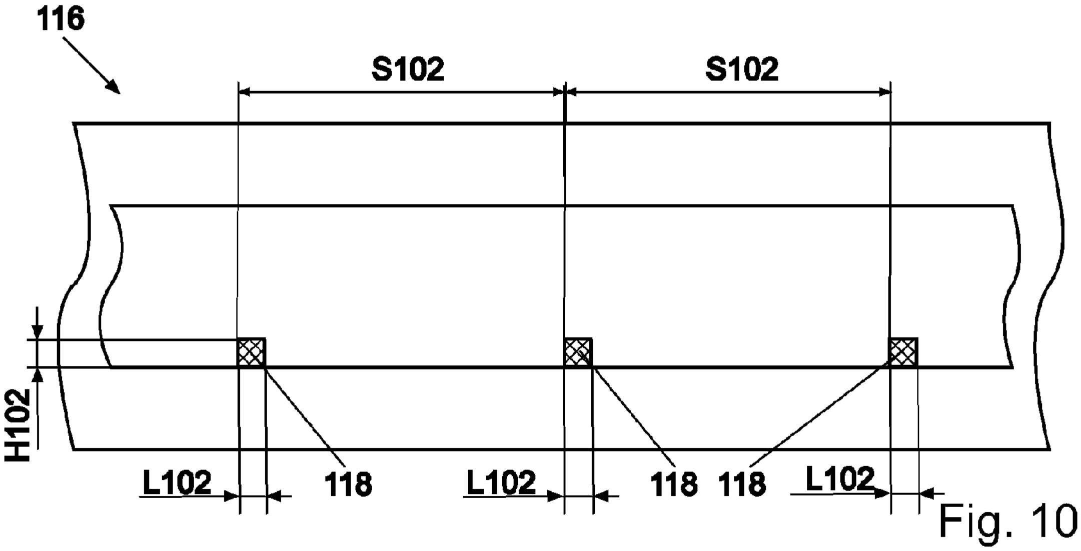
FIG. 10 is a view from below of a further variant of a profile according to the invention.
Figure 11:
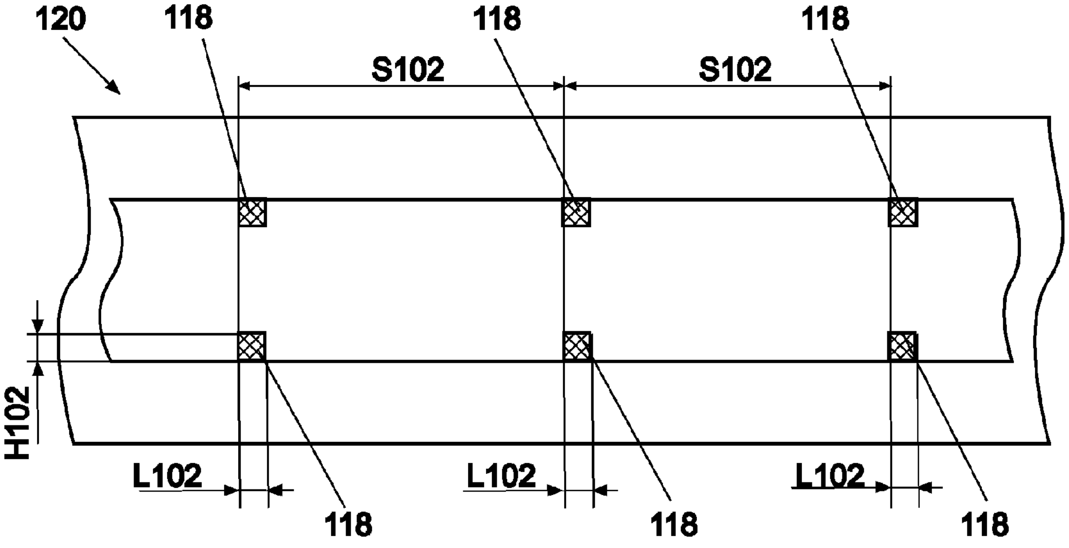
FIG. 11 is a view from below of a further variant of a profile according to the invention.

FIGS. 10 and 11 show further embodiments of labeling profiles according to the invention, with only the differences from the embodiment described above being discussed in order to avoid repetition.

The embodiment of a labeling profile 116 shown in FIG. 10 differs from the embodiment described above in that position marks 118 are provided of which the height H102 is only 3 mm. The length L102 is 4 mm in the present case. According to the further variant of a labeling profile 120, such position marks 118 are arranged in two rows (FIG. 11).

In order to produce a labeling strip or individual profile for an electrical installation, a labeling profile 102, 116, 120 is first provided.

The labeling profile 102, 116, 120 is fed to a printer (not shown). Inside the printer, the top surface 106 is labeled in the region of the printing regions 122, 124.

Subsequently, the relevant labeling profile is trimmed or cut to length into at least one, two or more labeling strips, where, for example, a predefined length L103 is cut to length from the labeling profile 102 for the printing region 122 provided for a first labeling strip.

The respective position marks 112, 118 are optically detected before, during or after the labeling.

In the present case, a plurality of labeling strips is produced from one labeling profile 102, 116, 120 in each case, the length of a first labeling strip and/or the length of a second labeling strip being increased or shortened if a deviation in the feed speed of the printer has been detected on the basis of the detected position marks, in particular if the feed speed is set to a constant value. The correction of the length indicated by the arrows 126.

REFERENCE SIGNS

2 Labeling material
4 Top layer
6 Top surface
8 Joining surface
10 Foam layer
12 Shaped element
14 Shaped element
16 Receptacle
18 Support layer
20 Side
22 Position mark
24 Labeling strip
26 Receiving groove
28 Labeling material
30 Top layer
32 Top surface
34 Joining surface
36 Foam layer
38 Shaped element
40 Shaped element
42 Side
44 Position mark
46 Labeling strip
48 Guide channel
B1 Width
B2 Width
B3 Width
B4 Width
B5 Width
B6 Width
D1 Thickness

D2 Thickness
D3 Thickness
D4 Thickness
D5 Thickness
D6 Thickness
102 Labeling profile
104 Labeling region
106 Top surface
108 Bearing region
L Longitudinal extension direction
110 Surface
112 Position mark
114 Intermediate region
L101 Length
H101 Height
S101 Spacing
116 Labeling profile
118 Position mark
H102 Height
L102 Length
120 Labeling profile
122 Printing region
124 Printing region
L103 Length
126 Arrow

The invention claimed is:

1. Labeling material for marking electrical installations, comprising:

a top layer, wherein the top layer has a top surface which is designed for printing and a joining surface facing away from the top surface, a foam layer, at least one shaped element configured for a form-fitting attachment to a receptacle by insertion into an undercut or groove, and a support layer, wherein the foam layer comprises a foamed material, wherein the foam layer is integrally bonded to the top layer in a region of the joining surface, wherein the shaped element is arranged at a spacing from the top layer, wherein the support layer is integrally bonded to the foam layer on a side of the foam layer facing away from the top layer, and the shaped element is a part of the support layer, characterized in that the support layer, viewed in a cross section, has a greater width than the foam layer.

2. Labeling material according to claim 1, characterized in that the top layer, viewed in a cross section, has a greater width than the foam layer and/or the top layer, viewed in a cross section, has a smaller thickness than the foam layer.

3. Labeling material according to claim 1, characterized in that the shaped element is a ridge.

4. Labeling material according to claim 1, characterized in that the shaped element is part of the foam layer.

5. Labeling material according to claim 1, characterized in that the support layer, viewed in a cross section, has a smaller width than the top layer.

6. Labeling material according to claim 1, characterized in that the labeling material is provided with one or more position marks on a side facing away from the top surface.

7. Labeling material according to claim 1, characterized in that the layers of the labeling material are connected to one another by means of gluing and/or heat sealing.

8. Method for producing the labeling strip for an electrical installation, comprising the method steps of:

providing a labeling material, wherein the labeling material is designed according to claim 1;

feeding the labeling material to a label printer;

compressing the foam layer between a print head and a print roller of the label printer while the top layer is being labeled, wherein the print roller is in particular profiled;

trimming and/or perforating the labeling material to form at least one labeling strip at a predefined length.

9. Labeling material according to claim 6, characterized in that the labeling material is provided with one or more optical position marks.

10. Labeling material for marking electrical installations, comprising a top layer, wherein the top layer has a top surface which is designed for printing and a joining surface facing away from the top surface, comprising a foam layer, comprising at least two shaped elements for form-fitting attachment to a receptacle by inserting into and undercut or groove, wherein each shaped element is a ridge, wherein the ridge viewed in a cross section is shaped so as to protrude in a width direction, wherein the shaped elements are part of the foam layer, wherein the foam layer comprises a foamed material, wherein the foam layer is integrally bonded to the top layer in the region of the joining surface, wherein the shaped elements are arranged at a spacing from the top layer, and wherein the foam layer comprising shaped elements can have one or more molded-in guide channels on the side facing away from the top layer, which guide channels serve to guide the labeling material along a profiled printer roller.

11. Method for producing a labeling strip for an electrical installation, comprising the method steps of:

providing a labeling material, wherein the labeling material is designed according to claim 10;

feeding the labeling material to a label printer, compressing the foam layer between a print head and a print roller of the label printer while the top layer is being labeled, wherein the print roller is in particular profiled;

trimming and/or perforating the labeling material to form at least one labeling strip at a predefined length.

* * * * *